(12) United States Patent
Shirakawa et al.

(10) Patent No.: US 6,673,491 B2
(45) Date of Patent: Jan. 6, 2004

(54) CATHODE ELECTROACTIVE MATERIAL, PRODUCTION METHOD THEREFOR, AND NONAQUEOUS SECONDARY CELL USING THE SAME

(75) Inventors: Akihiko Shirakawa, Chiba (JP); Takao Noda, Chiba (JP)

(73) Assignee: Showa Denko Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/765,349

(22) Filed: Jan. 22, 2001

(65) Prior Publication Data

US 2001/0014421 A1 Aug. 16, 2001

Related U.S. Application Data

(60) Provisional application No. 60/214,424, filed on Jun. 28, 2000.

(30) Foreign Application Priority Data

Jan. 21, 2000 (JP) ..................... P2000-017811

(51) Int. Cl.[7] ................................. H01M 4/50
(52) U.S. Cl. ............... 429/224; 429/231.1; 429/221; 429/223; 429/231.6; 429/231.95; 423/599
(58) Field of Search ............... 429/224, 231.1, 429/223, 221, 231.6, 231.95; 423/599

(56) References Cited

U.S. PATENT DOCUMENTS 5,658,693 A * 8/1997 Thackeray et al. ......... 423/599
5,807,646 A * 9/1998 Iwata et al. ................. 429/224
6,267,943 B1 * 7/2001 Manev et al. ............... 423/599

FOREIGN PATENT DOCUMENTS

| JP | 07-262984 | 10/1995 |
| JP | 10-172571 | 6/1998 |

OTHER PUBLICATIONS

Journal of Solid State Chemistry 39, 142–147 (1981), James C. Hunter, "Preparation of a New Crystal Form of Manganese Dioxide: $\lambda$–$MnO_2$".

* cited by examiner

Primary Examiner—Laura Weiner
(74) Attorney, Agent, or Firm—Sughrue Mion, PLLC

(57) ABSTRACT

The present invention provides a cathode electroactive material comprising a composite oxide comprising $\beta$-$MnO_2$ and a spinel oxide predominantly comprising lithium, manganese, and oxygen.

The present invention provides a process for producing said material, which process comprises acid treatment of a composite oxide comprising a spinel oxide predominantly comprising lithium, manganese, and oxygen, and heat treatment of the resultant composite oxide at a temperature of about 200° C. or higher and lower than about 400° C.

The thus-produced oxide is employed as a cathode electroactive material in a non-aqueous secondary cell.

24 Claims, No Drawings

CATHODE ELECTROACTIVE MATERIAL, PRODUCTION METHOD THEREFOR, AND NONAQUEOUS SECONDARY CELL USING THE SAME

CROSS REFERENCE TO RELATED APPLICATION

This application is an application filed under 35 U.S.C. §111(a) claiming benefit pursuant to 35 U.S.C. §119(e)(1) of the filing date of Provisional Application No. 60/214,424, filed Jun. 28, 2000 to 35 U.S.C. §111(b).

FIELD OF THE INVENTION

The present invention relates to a lithium-ion secondary cell comprising an Mn cathode electroactive material, the cathode electroactive material, and a process for producing the active substance. The cell has high initial discharge capacity, and the discharge capacity barely reduces even when charging and discharging are repeated at 60° C.

BACKGROUND OF THE INVENTION

As a cathode electroactive material which is employed in a non-aqueous electrolyte secondary cell (hereinafter may be referred to as "non-aqueous secondary cell"), lithium manganate of spinel structure (hereinafter may be referred to as "spinel $LiMn_2O_4$") has currently been studied due to its advantages: it has an abundant resource base, can be produced at low cost, and is very safe. However, the electric capacity of the cells is drastically reduced at 60° C. or higher, and thus the aforementioned materials are unsatisfactory as cathode electroactive materials employable in a non-aqueous secondary cell. For example, in a non-aqueous secondary cell comprising such a material serving as a cathode electroactive material, when charging and discharging are repeated 500 times, the discharge capacity of the cell is at most 90 mAh/g. Therefore, there has been a demand for further improvements to non-aqueous secondary cells.

Japanese Patent Application Laid-Open (kokai) No. 7-262984 discloses a cell comprising, as a cathode electroactive material, lithium manganate coated with an $Li_2MnO_3$ layer which is produced through heat treatment of a mixture of a lithium compound and $LiMn_2O_4$ at 400–1,325° C. In addition, Japanese Patent Application Laid-Open (kokal) No. 10-172571 discloses a cell containing lithium manganate having a two-layer structure which is produced by soaking lithium manganate having a spinel structure in a solution containing an Li ion or Mn ion, and then heating the resultant lithium manganate at 300–1, 200° C.

In view of the foregoing, the present invention provides a non-aqueous secondary cell exhibiting excellent cycle characteristics, which comprises a negative electrode containing lithium as an active substance, a non-aqueous electrolyte, and a positive electrode comprising, as an active substance, a spinel composite oxide comprising lithium, manganese, and oxygen, wherein the discharge capacity is maintained at 95 mAh/g or more after charging and discharging of the cell are repeated 500 times at 60° C. The present invention also provides a cathode electroactive material which enables production of a cell exhibiting excellent cycle characteristics, and a process for producing the active substance.

SUMMARY OF THE INVENTION

The present invention provides:

(1) a cathode electroactive material comprising a composite oxide comprising $\beta$-$MnO_2$ and a spinel oxide predominantly comprising lithium, manganese, and oxygen;

(2) a cathode electroactive material comprising a composite oxide according to (1), wherein the $\beta$-$MnO_2$ is comprised on the surface of the composite oxide;

(3) a cathode electroactive material comprising a composite oxide according to (1) or (2), wherein the $\beta$-$MnO_2$ is comprised in the composite oxide in an amount of about 1–13 mol %;

(4) a cathode electroactive material comprising a composite oxide according to any one of (1) through (3), wherein the spinel oxide predominantly comprising lithium, manganese, and oxygen is $LiMn_2O_4$ formed of lithium, manganese, and oxygen; or a composite oxide $Li_{1+x}Mn_{2-x-y}M_yO_4$ (wherein $-0.1 \leq x \leq 0.2$, and $0 \leq y \leq 0.2$) in which a portion of Li or Mn in $LiMn_2O_4$ is replaced by a different element such as chromium, cobalt, aluminum, nickel, iron, or magnesium;

(5) a cathode electroactive material comprising a composite oxide according to any one of (1) through (4), wherein the composite oxide is a granule having a particle size of about 3–50 $\mu$m;

(6) a cathode electroactive material comprising a composite oxide according to any one of (1) through (5), which has pores of about 30–400 Å;

(7) a paste for producing an electrode, which comprises a cathode electroactive material comprising a composite oxide as recited in any one of (1) through (6);

(8) a positive electrode comprising a cathode electroactive material comprising a composite oxide as recited in any one of (1) through (6);

(9) a process for producing a cathode electroactive material comprising a composite oxide as recited in any one of (1) through (6), which process comprises acid treatment of a composite oxide comprising a spinel oxide predominantly comprising lithium, manganese, and oxygen, and heat treatment of the resultant composite oxide at a temperature of about 200° C. or higher and lower than about 400° C.;

(10) a non-aqueous secondary cell comprising a negative electrode comprising lithium as an active substance, a non-aqueous electrolyte, and a positive electrode comprising, as an active substance, a composite oxide comprising lithium, manganese, and oxygen, wherein the composite oxide is a cathode electroactive material comprising a composite oxide as recited in any one of (1) through (6).

DETAILED DESCRIPTION OF THE INVENTION

The present invention will next be described in detail.

The process for producing a cathode electroactive material of the present invention comprises acid treatment of a composite oxide having a spinel structure predominantly comprising lithium, manganese, and oxygen; and heat treatment of the composite oxide at a specific temperature; i.e., about 200° C. or higher but lower than about 400° C. By means of the process, a composite oxide comprising $\beta$-$MnO_2$ and an oxide having a spinel structure predominantly comprising lithium, manganese, and oxygen can be produced. Preferably, the surface layer of the composite oxide compresses substantially of $\beta$-$MnO_2$. As used herein, the term "a composite oxide having a spinel structure predominantly comprising lithium, manganese, and oxygen" refers to $LiMn_2O_4$ formed of lithium, manganese, and oxygen; and a composite oxide $Li_{1+x}Mn_{2-x-y}M_yO_4$ (wherein $-0.1 \leq x \leq 0.2$, and $0 \leq y \leq 0.2$) in which a portion of Li or Mn of $LiMn_2O_4$ is replaced by a different element such as chromium, cobalt, aluminum, nickel, iron, or magnesium. The lattice constant of the composite oxide is preferably 8.240 Å or less.

As used herein, the phrase "comprises substantially of $\beta$-$MnO_2$," refers to the case in which the surface layer of a composite oxide having a spinel structure predominantly comprising lithium, manganese, and oxygen comprises at least one lattice of $\beta$-$MnO_2$.

In the present invention, no particular limitation is imposed either on the process for producing a composite oxide having a spinel structure predominantly comprising lithium, manganese, and oxygen, or the starting material of the composite oxide. For example, such a composite oxide may be produced through the following process: a mixture of a manganese compound and a lithium compound, or a mixture of a manganese compound, a lithium compound, and a compound comprising an element which can replace to manganese may be calcined at a temperature of about 300–850° C. for at least about one hour in air or under oxygen-gas flow.

No particular limitation is imposed on the crystallinity of a composite oxide having a spinel structure predominantly comprising lithium, manganese, and oxygen. The composite oxide may contain a non-reacted lithium compound or manganese oxide. Examples of manganese sources which may be employed as a starting material include electrolytic manganese dioxide (EMD), chemically synthesized manganese dioxide (CMD), manganese sesquioxide, trimanganese tetroxide, manganese oxyhydroxide, manganese carbonate, and manganese nitrate. Examples of lithium sources which may be employed include lithium hydroxide, lithium carbonate, and lithium nitrate. Of the aforementioned manganese sources, manganese carbonate is preferable due to its high reactivity with lithium.

In the present invention, no particular limitation is imposed on the species of acid which may be employed, so long as the acid is able to dissolve lithium and manganese on the surface of a composite oxide having a spinel structure predominantly comprising lithium, manganese, and oxygen. For example, a Bronsted acid may be employed. Examples of Bronsted acids include inorganic acids such as hydrochloric acid, hydrobromic acid, hydroiodic acid, hydrofluoric acid, nitric acid, amidosulfuric acid, sulfuric acid, and phosphoric acid; organic sulfonic acids such as methanesulfonic acid, ethanesulfonic acid, propanesulfonic acid, benzenesulfonic acid, toluenesulfonic acid, naphthalenesulfonic acid, and naphthalenedisulfonic acid; and organic carboxylic acids such as trifluoroacetic acid, trichloroacetic acid, formic acid, and oxalic acid. Of these, hydrochloric acid, nitric acid, sulfuric acid, or an organic sulfonic acid is preferable.

When a composite oxide having a spinel structure predominantly comprising lithium, manganese, and oxygen is subjected to acid treatment using nitric acid, the surface layer of the oxide having a spinel structure is changed into $\lambda$-$MnO_2$ through the reaction represented by the following formula:

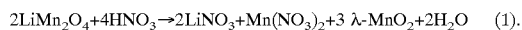

$$2LiMn_2O_4 + 4HNO_3 \rightarrow 2LiNO_3 + Mn(NO_3)_2 + 3\ \lambda\text{-}MnO_2 + 2H_2O \quad (1).$$

In the process for producing a cathode electroactive material of the present invention, completion of conversion of $LiMn_2O_4$ having a spinel structure into $\lambda$-$MnO_2$ through the reaction represented by formula (1) can be confirmed by the detection of pH in the acidic solution. The conversion rate of $LiMn_2O_4$ having a spinel structure may be determined in accordance with the mol of the acid employed in acid treatment. In the process for producing a cathode electroactive material of the present invention, a composite oxide having a spinel structure, which is partially converted into $\lambda$-$MnO_2$ through acid treatment, is be heated at a specific temperature within a range of about 200° C. or higher but less than about 400° C., to thereby produce a composite oxide, the surface layer of which comprises substantially of $\beta$-$MnO_2$.

With reference to the above-described reaction, the Journal of Solid State Chemistry 39, 142–147 (1981) reported that $LiMn_2O_4$ having a spinel structure could be converted into $\lambda$-$MnO_2$ through treatment with a water-soluble acid solution. However, this publication does not describe or suggest a method for converting only the surface layer of the composite oxide having a spinel structure into $\lambda$-$MnO_2$. In addition it does not describe the composite oxide having a two-layer structure in which the surface layer of $LiMn_2O_4$ having a spinel structure is $\lambda$-$MnO_2$. The composite oxide having a two-layer spinel structure employed as a cathode electroactive material in a non-aqueous secondary cell is also not described. The Journal of Solid State Chemistry 39, 142–147 (1981) reports that $\lambda$-$Mno_2$ has a semi-stable phase and can be converted into $\beta$-$MnO_2$ which has a stable phase, through heat treatment of a sufficient duration, but this publication does not describe use of $\beta$-$Mno_2$ in the composite oxide having a two-layer spinel structure or as a cathode electroactive material in a non-aqueous secondary cell.

A cathode electroactive material which is produced through the process of the present invention is a composite oxide comprising $\beta$-$MnO_2$ and an oxide having a spinel structure predominantly comprising lithium, manganese, and oxygen. Preferably, the surface layer of the composite oxide having a spinel structure substantially comprises $\beta$-$MnO_2$. The composite oxide is effectively employed as a material for a positive electrode in a non-aqueous secondary cell.

In the acid treatment of the surface of the spinel composite oxide predominantly comprising lithium, manganese, and oxygen, the concentration and the mol of the acid employed or the reaction time may be determined in accordance with the desired amount (mol) of $\lambda$-$MnO_2$. The conversion (mol %) of $LiMn_2O_4$ having a spinel structure into $\lambda$-$MnO_2$ is preferably about 1–13 mol % on the basis of the entirety of the spinel composite oxide, more preferably about 2–7 mol %, much more preferably about 3–mol %. When the conversion (mol %) into $\lambda$-$MnO_2$ is less than about 1 mol %, the intended effects are not obtained through surface treatment, whereas when the conversion is in excess of about 13 mol%, the initial discharge capacity of a non-aqueous secondary cell comprising the composite oxide is drastically and unsatisfactorily reduced.

When the surface of the composite oxide comprises only $\lambda$-$MnO_2$, lithium ions are taken into the oxide during discharging, and then a composite oxide having only a spinel structure is reproduced. As a result, the surface layer of the composite oxide cannot be stabilized due to the repeated charging and discharging of the cell. Therefore, in the present invention, the cathode electroactive material comprising the composite oxide having a spinel structure comprising $\beta$-$MnO_2$ in an amount of about 1–13 mol % is employed as the material for the positive electrode in the non-aqueous secondary cell.

In the non-aqueous secondary cell of the present invention, the composite oxide which is employed as the cathode electroactive material preferably comprises a β-MnO$_2$ phase in the surface layer. The composite oxide has a primary particle size of about 0.1–1 μm, preferably about 0.2–0.5 μm. In the present invention, the composite oxide may be granulated so as to have a primary particle size of about 3–50 μm, preferably about 5–30 μm.

In the present invention, the composite oxide having a spinel structure predominantly comprising lithium, manganese, and oxygen can be produced as dense granules. The granules are produced through the following procedure: the composite oxide is calcined and pulverized; the thus-pulverized particles (which are primary particles or secondary particles formed through coagulation of the primary particles, and preferably having a mean particle size of about 2 μm or less) are mixed with a sintering accelerator (granulation accelerator) and the resultant mixture is calcined to achieve granulation. As used herein, the term "dense granules" refers to granules comprising the primary particles of the composite oxide having no or few spaces therebetween. Such dense granules may be produced by use of a sintering agent as follows.

No particular limitation is imposed on the method for mixing a sintering accelerator with the pulverized composite oxide having a spinel structure predominantly comprising lithium, manganese, and oxygen. For example, the mixing may be carried out by use of a medium-stirring type pulverizing machine, a ball mill, a paint shaker, or a mixer. The pulverized composite oxide may be wet-mixed or dry-mixed with the sintering accelerator. The composite oxide may be mixed with the sintering accelerator during pulverizing of the oxide.

The sintering accelerator employed is not particularly limited, so long as it enables sintering of pulverized particles of the composite oxide predominantly comprising lithium, manganese, and oxygen which in turn allows granulation of the particles. The sintering accelerator is preferably a compound which melts at about 900° C. or lower. For example, the compound may be an oxide which melts at about 550–900° C. or a precursor which may be converted into the oxide; or an oxide which melts or reacts with lithium or manganese, or a compound which can be converted into the oxide. The sintering accelerator may be a compound comprising an element such as Bi, B, W, Mo, or Pb. Such compounds may be employed in combination. The sintering accelerator may be a compound comprising B$_2$O$_3$ and LiF, or a compound comprising MnF$_2$ and LiF. The sintering accelerator is more preferably a compound comprising Bi, B, or W, since such a compound exerts a potent shrinkage effect.

Examples of Bi compounds include bismuth trioxide, bismuth nitrate, bismuth benzoate, bismuth hydroxyacetate, bismuth oxycarbonate, bismuth citrate, and bismuth hydroxide. Examples of B compounds include boron sesquioxide, boron carbide, boron nitride, and boric acid. Examples of W compounds include tungsten dioxide and tungsten trioxide.

The amount of sintering accelerator added to the composite oxide is about 0.0001–0.05 mol (as reduced to a metallic element in the accelerator) on the basis of 1 mol of Mn contained in the oxide. If the amount is less than 0.0001 mol, the sintering accelerator exerts no sintering-shrinkage effect, whereas if the amount is in excess of about 0.05 mol, the initial capacity of the active substance comprising the composite oxide becomes very low. The amount is preferably about 0.005–0.03 mol.

The sintering accelerator may be employed in the form of particles, or may be dissolved in a solvent to be employed in a liquid form. When the sintering accelerator is employed in the form of particles, the accelerator preferably has a mean particle size of about 50 μm or less, more preferably about 10 μm or less, much more preferably about 3 μm or less. The sintering accelerator is preferably added to the pulverized composite oxide particles before granulation and sintering of the particles. Alternatively, after granulation of the particles, the resultant granules are impregnated with the sintering accelerator at a temperature at which the accelerator can melt, and sintering may be carried out following this step.

A method for the granulation will next be described.

Granulation may be carried out using a sintering accelerator in the form of spray granulation, flow granulation, compression granulation, or stirring granulation. Granulation may be carried out in conjunction with medium-flow drying or medium-vibration drying. Stirring granulation or compression granulation is preferably employed because secondary particles having a high density can be produced. Spray granulation is preferably employed because true-spherical granules can be produced. Examples of stirring granulation apparatuses include a vertical granulator (product of Paurec) and a SPARTAN RYUZER (product of Fuji Paudal). Examples of compression granulation apparatuses include a roller compactor (model: MRCP-200, product of Kurimoto Tekko). Examples of spray granulation apparatuses include a mobile-minor-type spray dryer (product of Ashizawaniro Atomizer).

In the present invention, no particular limitation is imposed on the size of the granules employed in the positive electrode. When the mean size of the granules is excessively large, the granules can be slightly pulverized immediately after granulation or after sintering of the particles and then subjected to classification and size regulation to thereby obtain granules of a desired size. In order to enhance granulation efficiency, an organic granulating aid may be added. Examples of granulating aids include acrylic resin, copolymers of isobutylene and maleic anhydride, polyvinyl alcohol, polyethylene glycol, polyvinyl pyrrolidone, hydroxypropyl cellulose, methyl cellulose, cornstarch, gelatin, and lignin. The amount of the granulating agent added is preferably about five parts by weight or less on the basis of 100 parts by weight of a mixture of the sintering accelerator and the composite oxide having a spinel structure predominantly comprising lithium, manganese, and oxygen, more preferably two parts by weight or less.

A method for sintering the granules will next be described.

The granules containing the organic binder are degreased at about 300–550° C. for about 10 minutes or more in air or in an oxygen-gas-containing atmosphere. The amount of residual carbon in the granules is preferably about 0.1% or less. The degreased granules are sintered at about 550–900° C. for about one minute or more in air or in an oxygen-containing atmosphere.

Even when an organic granulating aid is not employed, the granules may be sintered and shrunk in air or in an oxygen-gas-containing atmosphere in the manner described above, to thereby produce dense secondary particles When the thus-produced granules (including secondary particles) or the primary particles of the composite oxide—the surface layer of the granules or primary particles comprising a β-MnO$_2$ phase—are employed as the cathode electroactive material, the non-aqueous secondary cell comprising the substance has a high initial discharge capacity. In addition, the discharge capacity of the cell is barely reduced even when charging and discharging at 60° C. is carried out repeatedly. In the case in which the granulated secondary particles have a size of about 20 μm, the thickness of the surface layer comprising $\beta$-$MnO_2$ is about 0.02–0.22 $\mu$m, preferably about 0.05–0.08 $\mu$m.

The process for producing the cathode electroactive material of the present invention is characterized in that $\lambda$-$MnO_2$ comprised in the surface of the composite oxide having a spinel structure is converted into $\beta$-$MnO_2$ which is stable throughout the charging and discharging of the cell. This is brought about through heat treatment at a temperature of about 200° C. or more but less than about 400° C. When the heat treatment is carried out at temperatures lower than about 200° C., $\lambda$-$MnO_2$ may not be converted into $\beta$-$MnO_2$, whereas when the heat treatment is carried out at about 400° C. or higher, lithium contained in the composite oxide having a spinel structure diffuses on the surface of the oxide, and thus the surface cannot be stabilized. Diffusion of lithium on the surface of the oxide can be confirmed by the lattice constant of the oxide; i.e., when lithium diffuses on the surface of the oxide, the lattice constant of the oxide is larger than that of the oxide which is heat-treated at a temperature of about 200° C. or higher but less than about 400° C. The heat treatment may be carried out for at least five minutes.

In the present invention, particles of the composite oxide having a spinel structure comprising predominantly lithium, manganese, and oxygen may be subjected to acid treatment, which results in the development of pores of 30–400 Å. When the composite oxide particles having such pores are employed as the cathode electroactive material, the current density of the surface of the substance may be locally reduced during charging and discharging, and thus the cycle characteristics of the cell may be remarkably enhanced.

In general, in order to enhance cell characteristics, side reactions of the cathode electroactive material must be suppressed, and thus it is desirable that the cathode electroactive material have a small specific surface area (about 1 $m^2$/g or less). Surprisingly, although the cathode electroactive material of the present invention has a large specific surface area of about 1.5 $m^2$/g or more, the secondary cell exhibits excellent characteristics as compared with a conventional cell.

A method for employing the cathode electroactive material of the present invention as a material for a positive electrode in a non-aqueous secondary cell will next be described.

The positive electrode material is produced through the following procedure: the cathode electroactive material, a conductivity-imparting agent such as carbon black or graphite, and a binder such as polyvinylidene fluoride are dissolved in a solvent (e.g., N-methylpyrrolidone) in appropriate proportions and kneaded; the resultant electrode paste is applied to a current-collecting material; and the paste-applied material is dried and then pressed using a roll press. The current-collecting material may be a known metallic current-collecting material such as aluminum, stainless steel, or titanium.

In the non-aqueous secondary cell of the present invention, an electrolytic salt contained in an electrolytic solution may be a known fluorine-containing lithium salt. For example, $LiPF_6$, $LiBF_4$, $LiN(CF_3SO_2)_2$, $LiAsF_6$, $LiCF_3SO_{31}$ or $LiC_4F_9SO_3$ may be employed. The electrolytic solution of the non-aqueous secondary cell is produced by dissolving at least one species of the aforementioned known fluorine-containing lithium salts in a non-aqueous electrolytic solution. The non-aqueous solvent for the non-aqueous electrolytic solution is not particularly limited, so long as the solvent is chemically or electrochemically stable and aprotic. Examples of such solvents include carbonic acid esters such as dimethyl carbonate, propylene carbonate, ethylene carbonate, methyl ethyl carbonate, methyl propyl carbonate, methyl isopropyl carbonate, methyl butyl carbonate, diethyl carbonate, ethyl propyl carbonate, diisopropyl carbonate, dibutyl carbonate, 1,2-butylene carbonate, ethyl isopropyl carbonate, and ethyl butyl carbonate; oligoethers such as triethylene glycol methyl ether and tetraethylene glycol dimethyl ether; aliphatic esters such as methyl propionate and methyl formate; aromatic nitriles such as benzonitrile and tolunitrile; amides such as dimethylformamide; sulfoxides such as dimethyl sulfoxide; lactones such as $\gamma$-butyrolactone; sulfur compounds such as sulfolane; N-vinylpyrrolidone; N-methylpyrrolidone; and phosphoric acid esters. Of these, in the present invention, carbonic acid esters, aliphatic esters, or ethers are preferable.

In the non-aqueous secondary cell of the present invention, the material for the negative electrode is not particularly limited, so long as it can reversibly occlude or release lithium ions. For example, the material may be metallic lithium, lithium alloy, carbon material (including graphite), or metallic chalcogen.

A method for evaluating electrode characteristics will next be described.

The cathode electroactive material, Vulcan XC-72 (product of Cabot Corp.) serving as a conductive material, and an ethylene tetrafluoride resin serving as a binder are mixed in proportions by weight of 50:34:16, and the resultant mixture is relaxed with toluene over 12 hours. The expanded mixture is applied onto a current-collecting material comprising aluminum expanded metal, and shaped at a pressure of about 2 t/$cm^2$, and the toluene is then evaporated to thereby produce a positive electrode. The negative electrode is produced from lithium foil. Propylene carbonate and dimethyl carbonate are mixed in a ratio by volume of about 1:2, and $LiPF_6$ is dissolved in the resultant mixture in a concentration of 1 mol/liter, to thereby produce an electrolytic solution. A separator made of polypropylene is employed. In order to prevent a micro short circuit due to dendrite formation in the negative electrode, silica fibrous filter paper QR-100 (product of Advantec Toyo Co.) serving as a reinforcing material is added. A 2016-type coin-shaped cell is produced from a combination of the positive electrode, the negative electrode, the electrolytic solution, the separator, and the reinforcing material. The thus-produced cell is subjected to a charging and discharging test of 500 cycles in a thermostatic chamber of 60° C. Measurement conditions are as follows: constant-current-constant-voltage charging and constant-current discharging; charging or discharging rate IC (charging time: 2.5 hours); and scanning voltage 3.1–4.3 V.

BEST MODE FOR CARRYING OUT THE INVENTION

The cathode electroactive material and the non-aqueous secondary cell comprising the substance of the present invention will next be described in detail by way of Examples and Comparative Examples, which should not be construed as limiting the invention thereto.

Measurement of the distribution of pores of 400 Å in the cathode electroactive material of the present invention was carried out as follows. A porosimeter (model: 2000WS, product of Carloelva) was employed as a measurement apparatus; the cathode electroactive material and mercury were maintained in vacuum for one hour (pre-treatment for measurement); and then mercury was introduced into the pores of the substance under pressure of 2,000 bar over 40 minutes and measurement was carried out.

The structure of the cathode electroactive material was confirmed through X-ray diffraction under the following conditions. X-ray source: CuKα; output: 50 kV, 180 mA; slit: 1/2–1/2–0.15 mm; measurement method: 2θ/θ method; measurement range: 20–90°; scanning rate: 5°/minute.

EXAMPLE 1

Manganese carbonate, lithium carbonate, and aluminum hydroxide were mixed by use of a ball mill such that mol proportions of Li:Mn:Al were 1.02:1.967:0.013. The resultant mixture was subjected to reaction in air at 650° C. for four hours, and further mixed by use of a ball mill. Subsequently, the resultant mixture was calcined in air at 750° C. for 20 hours, to thereby obtain particles of a spinel composite oxide predominantly comprising lithium, manganese, and oxygen (average primary particle size: 0.5 $\mu$m, specific surface area: 4.2 m$^2$/g). The thus-obtained particles of the composite oxide were added to an aqueous solution containing nitric acid in an amount of 5 mol % on the basis of the entirety of the oxide. After the pH of the solution was found to be constant at 5, the solution was subjected to filtration and washing, and then dried in vacuum at 100° C. Thereafter, the resultant particles were heated at 300° C. for four hours, to thereby produce the cathode electroactive material of the present invention. The thus-produced cathode electroactive material was subjected to X-ray diffraction, to thereby detect an X-ray peak derived from β-MnO$_2$ around 2θ=30°, which peak was not detected in the non-heat-treated oxide.

Subsequently, the cathode electroactive material, Vulcan XC-72 (product of Cabot Corp.) serving as a conductive material, and an ethylene tetrafluoride resin serving as a binder were mixed in proportions by weight of 50:34:16. The resultant mixture was applied onto a positive electrode current-collecting material through a customary method, to thereby produce a positive electrode. Separately, propylene carbonate and dimethyl carbonate were mixed in a ratio by volume of 1:2, and LiPF$_6$ was dissolved in the resultant mixture in a concentration of 1 mol/liter, to thereby produce an electrolytic solution. The positive electrode, a lithium negative electrode, the electrolytic solution, a polypropylene separator, and a reinforcing material containing silica fiber were stacked, to thereby produce a 2016-type coin-shaped non-aqueous secondary cell.

The thus-produced cell was subjected to a 500-cycle charging-discharging test in a thermostatically controlled box at 60° C. Measurement conditions were as follows: constant-current-constant-voltage charging and constant-current discharging; charging-discharging rate IC (charging time: 2.5 hours); and scanning voltage 3.1–4.3 V.

The results are shown in Table 1.

EXAMPLE 2

The procedure of Example 1 was repeated, except that manganese carbonate, lithium carbonate, and aluminum hydroxide were mixed by use of a ball mill such that proportions by mol of Li:Mn:Al were 0.968:1.935:0.097, to thereby produce a non-aqueous secondary cell. The results of evaluation of the cell are shown in Table 1.

EXAMPLE 3

The procedure of Example 2 was repeated, except that acid treatment was carried out by use of an aqueous solution containing 10 mol % of nitric acid, to thereby produce a non-aqueous secondary cell. The results of evaluation of the cell are shown in Table 1.

EXAMPLE 4

Manganese carbonate and lithium carbonate were mixed by use of a ball mill so as to attain an Li/Mn mol ratio of 0.51. The resultant mixture was subjected to reaction in air at 650° C. for four hours. The resultant reaction mixture was dispersed into an ethanol solvent, and then pulverized by use of a wet-type ball mill, to thereby obtain particles having an average size of 0.5 $\mu$m. To the resultant particles, bismuth oxide particles having an average size of 2 $\mu$m were added so as to attain a Bi/Mn mol ratio of 0.0026, and the resultant mixture was granulated by use of Spultanryuzer (model: RMO-6H, product of Fuji Paudal). Polyvinyl alcohol serving as a granulation aid (1.5 parts by weight) in water was added to 100 parts by weight of the powder mixture of the pulverized reaction mixture and bismuth oxide, followed by granulation for 16 minutes. The resultant granules were slightly crushed and pulverized in a mixer, to thereby obtain powder having an average particle size of 20 $\mu$m as measured by a pneumatic classifier. The resultant granules were left to stand in air at 500° C. for two hours, to thereby degrease (i.e., to decompose polyvinyl alcohol in the granules). Thereafter, the resultant granules were fired in air at 750° C. for 20 hours, to thereby produce a composite oxide having a specific surface area of 1.6 m$^2$/g. Subsequently, the procedure of Example 1 was repeated, except that the thus-produced spinel composite oxide was added to an aqueous solution containing nitric acid in an amount of 2 mol % on the basis of the entirety of the oxide, to thereby produce a non-aqueous secondary cell. The results of evaluation of the cell are shown in Table 1.

EXAMPLE 5

The procedure of Example 4 was repeated, except that acid treatment was carried out by use of an aqueous solution containing 5 mol % of nitric acid, to thereby produce a non-aqueous secondary cell. The results of evaluation of the cell are shown in Table 1.

EXAMPLE 6

Lithium carbonate, manganese carbonate, and vapor-deposited alumina were mixed by use of a ball mill such that mol proportions of Li:Mn:Al were 1.02:1.967:0.013. The resultant mixture was subjected to reaction in air at 650° C. for four hours. To the resultant reaction mixture, boron oxide (0.8 wt. %) was added, and the mixture was dispersed in water, and then wet-pulverized by use of a ball mill so as to attain an average particle size of 0.3 $\mu$m. The resultant slurry was dried, and the resultant particles were granulated by use of Spultanryuzer RMO-6H (product of Fuji Paudal) and an aqueous solution of polyvinyl alcohol (1.5 wt. %) serving as a granulation binder. The thus-produced granules were slightly crushed and pulverized in a mixer, to thereby obtain powder having a size of 20 $\mu$m as measured by a pneumatic classifier. The resultant granules were left to stand in air at 500° C. for two hours, to thereby decompose the organic binder. Thereafter, the resultant granules were calcined in air at 750° C. for 30 minutes, to thereby produce a composite oxide having a specific surface area of 1.4 m$^2$/g.

Pure water was added to the thus-produced composite oxide, to thereby obtain a slurry (solid content: 20%). The resultant slurry was washed through the procedure including ultrasound treatment for five minutes and removal of supernatant. The procedure was repeated 10 times. The thus-washed slurry was dried at 100° C., and then subjected to acid treatment and heat treatment in a manner similar to that of Example 1, to thereby produce the cathode electroactive material of the present invention. The thus-produced cathode electroactive material was found to have pores of 50–320 through measurement, the pores not being present in the non-treated composite oxide. In addition, the thus-produced cathode electroactive material was measured through X-ray diffraction, to thereby detect an X-ray peak derived from β-$MnO_2$ around 2θ=30°, which peak was not detected in the non-treated composite oxide.

In a manner similar to that of Example 1, a non-aqueous secondary cell was produced by use of the thus-produced cathode electroactive material. The results of evaluation of the cell are shown in Table 1.

COMPARATIVE EXAMPLE 1

The procedure of Example 1 was repeated, except that acid treatment and heat treatment were not carried out, to thereby produce a non-aqueous secondary cell. The results of evaluation of the cell are shown in Table 1.

COMPARATIVE EXAMPLE 2

The procedure of Example 1 was repeated, except that heat treatment was carried out at 150° C. for four hours after acid treatment, to thereby produce a non-aqueous secondary cell. The results of evaluation of the cell are shown in Table 1.

COMPARATIVE EXAMPLE 3

The procedure of Example 1 was repeated, except that heat treatment was carried out at 400° C. for four hours after acid treatment, to thereby produce a non-aqueous secondary cell. The results of evaluation of the cell are shown in Table 1. The lattice constant of the cathode electroactive material of the Comparative Example was found to be 8.235 Å, which was greater than that of the cathode electroactive material of Example 1 (i.e., 8.231 Å) in which heat treatment was performed for 4 hours at 300° C.

COMPARATIVE EXAMPLE 4

The procedure of Example 4 was repeated, except that acid treatment was carried out by use of an aqueous solution containing nitric acid in an amount of 15 mol %, to thereby produce a non-aqueous secondary cell. The results of evaluation of the cell are shown in Table 1.

COMPARATIVE EXAMPLE 5

The procedure of Example 6 was repeated, except that washing with water, acid treatment, and the subsequent procedure were not carried out. The thus-produced cathode electroactive material was found to not contain pores having a size of 400 Å or less. In the active substance, an X-ray peak derived from β-$MnO_2$ was not detected. In a manner similar to that of Example 1, evaluation of cell characteristics of each cell produced by use of the cathode electroactive material was performed. The results are shown in Table 1.

TABLE 1

| | Specific surface area $m^2/g$ | Cycle characteristics at 60° C. (mAh/g) | |
| --- | --- | --- | --- |
| | | Initial discharge capacity | Discharge capacity after 500 cycles |
| Example 1 | 4.8 | 122 | 104 |
| Example 2 | 4.5 | 130 | 97 |
| Example 3 | 5.0 | 124 | 100 |

TABLE 1-continued

| | Specific surface area $m^2/g$ | Cycle characteristics at 60° C. (mAh/g) | |
| --- | --- | --- | --- |
| | | Initial discharge capacity | Discharge capacity after 500 cycles |
| Example 4 | 1.9 | 124 | 99 |
| Example 5 | 2.3 | 121 | 111 |
| Example 6 | 2.9 | 124 | 95 |
| Comparative Example 1 | 4.2 | 125 | 87 |
| Comparative Example 2 | 4.4 | 126 | 85 |
| Comparative Example 3 | 4.3 | 127 | 83 |
| Comparative Example 4 | 2.5 | 102 | 90 |
| Comparative Example 5 | 1.4 | 127 | 80 |

Industrial Application

The non-aqueous secondary cell of the present invention comprises a negative electrode containing lithium as an active substance; a non-aqueous electrolyte; and a positive electrode which is formed of the cathode electroactive material of the present invention comprising a composite oxide comprising lithium, manganese, and oxygen. Therefore, unlike a conventional cell, the cell of the present invention exhibits excellent characteristics; i.e., the discharge capacity of the cell can be maintained at 95 mAh/g or more even after charging and discharging are repeated 500 times at 60° C.

The cathode electroactive material of the present invention is formed by subjecting the surface of the spinel composite oxide predominantly comprising lithium, manganese, and oxygen to acid treatment, and then to heat treatment at a predetermined temperature range, to thereby convert the surface of the spinel composite oxide into β-$MnO_2$. Therefore, the non-aqueous secondary cell comprising the active substance exhibits excellent effects after 500 cycles of charging and discharging at 60° C.

In the present invention, a cathode electroactive material (particles) formed of the spinel composite oxide predominantly comprising lithium, manganese, and oxygen is subjected to acid treatment, so that the particles have pores of about 30–400 Å. When the composite oxide particles having such pores are employed as the cathode electroactive material in the non-aqueous secondary cell, the current density of the surface of the substance may be locally reduced during charging and discharging, and thus cycle characteristics of the cell may be remarkably enhanced.

What is claimed is:

1. A cathode electroactive material comprising a composite oxide comprising β-$MnO_2$ and a spinel oxide predominantly comprising lithium, manganese, and oxygen, wherein a surface layer of the composite oxide comprises β-$MnO_2$.

2. A cathode electroactive material comprising a composite oxide according to claim 1, wherein the β-$MnO_2$ is comprised in the composite oxide in an amount of about 1–13 mol %.

3. A cathode electroactive material comprising a composite oxide according to claim 1, wherein the spinel oxide predominantly comprising lithium, manganese, and oxygen is $LiMn_2O_4$ formed of lithium, manganese, and oxygen; or a composite oxide $Li_{1+x}Mn_2-x-y\ M_yO_4$ (wherein −0.1≦x≦0.2, and 0≦y≦0.2) in which a portion of Li or Mn in $LiMn_2O_4$ is replaced by a different element selected from the group consisting of chromium, cobalt, aluminum, nickel, iron and magnesium.

4. A cathode electroactive material comprising a composite oxide according to claim 3, wherein $\beta$-$MnO_2$ is comprised in the composite oxide in an amount of about 1–13 mol %.

5. A cathode electroactive material comprising a composite oxide comprising $\beta$-$MnO_2$, and a spinel oxide predominantly comprising lithium, manganese, and oxygen as claimed in claim 4, and wherein the composite oxide is a granule having a particle size of about 3–50 μm.

6. A paste for producing an electrode, which comprises a cathode electroactive material comprising a composite oxide as claimed in claim 1.

7. A cathode electrode comprising a cathode electroactive material comprising a composite oxide as claimed in claim 1.

8. A process for producing a cathode electroactive material comprising a composite oxide as claimed in claim 1, which process comprises acid treatment of a composite oxide comprising a spinel oxide predominantly comprising lithium, manganese, and oxygen, and heat treatment of the resultant composite oxide at a temperature of about 200° C. or higher and lower than about 400° C.

9. A non-aqueous secondary cell comprising a negative electrode comprising lithium as an active substance, a non-aqueous electrolyte, and a positive electrode comprising, as an active substance, a composite oxide comprising lithium, manganese, and oxygen, wherein the composite oxide is a cathode electroactive material comprising a composite oxide as claimed in claim 1.

10. A cathode electroactive material comprising a composite oxide comprising $\beta$-$MnO_2$ and a spinel oxide predominantly comprising lithium, manganese, and oxygen as claimed in claim 1, and wherein the composite oxide is a granule having a particle size of about 3–50 μm.

11. A cathode electroactive material comprising a composite oxide comprising $\beta$-$MnO_2$ and a spinel oxide predominantly comprising lithium, manganese, and oxygen, which has pores of about 30–400 Å, wherein the $\beta$-$MnO_2$ is comprised in the composite oxide in an amount of about 1–13 mol %.

12. A paste for producing an electrode, which comprises a cathode electroactive material comprising a composite oxide as claimed in claim 11.

13. A cathode electrode comprising a cathode electroactive material comprising a composite oxide as claimed in claim 11.

14. A non-aqueous secondary cell comprising a negative electrode comprising lithium as an active substance, a non-aqueous electrolyte, and a positive electrode comprising, as an active substance, a composite oxide comprising lithium, manganese, and oxygen, wherein the composite oxide is a cathode electroactive material comprising a composite oxide as claimed in claim 11.

15. A cathode electroactive material comprising a composite oxide comprising $\beta$-$MnO_2$ and a spinel oxide predominantly comprising lithium, manganese, and oxygen as claimed in claim 11, and wherein the composite oxide is a granule having a particle size of about 3–50 μm.

16. A cathode electroactive material comprising a composite oxide comprising $\beta$-$MnO_2$ and a spinel oxide predominantly comprising lithium, manganese, and oxygen, wherein the spinel oxide predominantly comprising lithium, manganese, and oxygen is $LiMn_2O_4$ formed of lithium, manganese, and oxygen; or a composite oxide $Li_{1+x}Mn_{2-x-y}M_yO_4$ (wherein −0.1≦x≦0.2, and 0≦y≦0.2) in which a portion of Li or Mn in $LiMn_2O_4$ is replaced by a different element selected from the group consisting of chromium, cobalt, aluminum, nickel, iron, and magnesium, and which has pores of about 30–400 Å, wherein the $\beta$-$MnO_2$ is comprised in the composite oxide in an amount of about 1–13 mol %.

17. A paste for producing an electrode, which comprises a cathode electroactive material comprising a composite oxide as claimed in claim 16.

18. A cathode electrode comprising a cathode electroactive material comprising a composite oxide as claimed in claim 16.

19. A non-aqueous secondary cell comprising a negative electrode comprising lithium as an active substance, a non-aqueous electrolyte, and a positive electrode comprising, as an active substance, a composite oxide comprising lithium, manganese, and oxygen, wherein the composite oxide is a cathode electroactive material comprising a composite oxide as claimed in claim 16.

20. A cathode electroactive material comprising a composite oxide comprising $\beta$-$MnO_2$ and a spinel oxide predominantly comprising lithium, manganese, and oxygen as claimed in claim 16, and wherein the composite oxide is a granule having a particle size of about 3–50 μm.

21. A process for producing a cathode electroactive material comprising a composite oxide comprising $\beta$-$MnO_2$ and a spinel oxide predominantly comprising lithium, manganese, and oxygen, wherein the composite oxide is a granule having a particle size of about 3–50 μm, which process comprises acid treatment of a composite oxide comprising a spinel oxide predominantly comprising lithium, manganese, and oxygen, and heat treatment of the resultant composite oxide at a temperature of about 200° C. or higher and lower than about 400° C.

22. A process for producing a cathode electroactive material comprising a composite oxide comprising $\beta$-$MnO_2$ and a spinel oxide predominantly comprising lithium, manganese, and oxygen, which has pores of about 30–400Å, which process comprises acid treatment of a composite oxide comprising a spinel oxide predominantly comprising lithium, manganese, and oxygen, and heat treatment of the resultant composite oxide at a temperature of about 200° C. or higher and lower than about 400° C.

23. A process for producing a cathode electroactive material comprising a composite oxide comprising $\beta$-$MnO_2$ and a spinel predominantly comprising lithium, manganese, and oxygen, wherein the spinel oxide predominantly comprising lithium, manganese, and oxygen is $LiMn_2O_4$ formed of lithium, manganese, and oxygen; or a composite oxide $Li_{1+x}Mn_{2-x-y}O_4$ (wherein −0.1≦x≦0.2, and 0≦y≦0.2) in which a portion of Li or Mn in $LiMn_2O_4$ is replaced by a different element selected from the group consisting of chromium, cobalt, aluminum, nickel, iron and magnesium, and wherein the composite oxide is a granule having a particle size of about 3–50 μm, which process comprises acid treatment of a composite oxide comprising a spinel oxide predominantly comprising lithium, manganese, and oxygen, and heat treatment of the resultant composite oxide at a temperature of about 200° C. or higher and lower than about 400° C.

24. A process for producing a cathode electroactive material comprising a composite oxide comprising $\beta$-$MnO_2$ and a spinel oxide predominantly comprising lithium, manganese, and oxygen, wherein the spinel oxide predominantly comprising lithium, manganese, and oxygen is LiMn$_2$O$_4$ formed of lithium, manganese, and oxygen; or a composite oxide Li$_{1+x}$Mn$_{2-x-y}$M$_y$O$_4$ (wherein $-0.1 \leq x 0.2$, and $0 y \leq 0.2$) in which a portion of Li or Mn in LiMn$_2$O$_4$ is replaced by a different element selected from the group consisting of chromium, cobalt, aluminum, nickel, iron, and magnesium, and which has pores of about 30–400 Å, which process comprises acid treatment of a composite oxide comprising a spinel oxide predominantly comprising lithium, manganese, and oxygen, and heat treatment of the resultant composite oxide at a temperature of about 200° C. or higher and lower than about 400° C.

* * * * *